United States Patent
Jayathirtha et al.

(10) Patent No.: US 8,412,392 B2
(45) Date of Patent: Apr. 2, 2013

(54) METHODS AND SYSTEMS FOR DISPLAYING PREDICTED DOWNPATH PARAMETERS IN A VERTICAL PROFILE DISPLAY

(75) Inventors: Srihari Jayathirtha, Karnataka (IN); Ravindra Joshi, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 463 days.

(21) Appl. No.: 12/711,653

(22) Filed: Feb. 24, 2010

(65) Prior Publication Data

US 2011/0208374 A1    Aug. 25, 2011

(51) Int. Cl.
G01C 23/00    (2006.01)
G06F 7/00    (2006.01)

(52) U.S. Cl. ............................................. 701/14; 701/5

(58) Field of Classification Search .................. 701/2–6, 701/14–18; 340/950, 951, 971–980
See application file for complete search history.

(56) References Cited

U.S. PATENT DOCUMENTS

| | | | | |
|---|---|---|---|---|
| 4,368,517 A * | 1/1983 | Lovering | | 701/16 |
| 5,445,021 A | 8/1995 | Cattoen et al. | | |
| 6,085,129 A * | 7/2000 | Schardt et al. | | 701/14 |
| 6,154,151 A | 11/2000 | McElreath et al. | | |
| 6,163,743 A | 12/2000 | Bomans et al. | | |
| 6,289,277 B1 | 9/2001 | Feyereisen et al. | | |
| 6,389,355 B1 | 5/2002 | Gibbs et al. | | |
| 7,366,591 B2 * | 4/2008 | Hartmann et al. | | 701/4 |
| 7,477,164 B1 | 1/2009 | Barber | | |
| 7,564,374 B2 * | 7/2009 | Winkler | | 340/971 |
| 8,014,912 B2 | 9/2011 | Zadrozynski et al. | | |
| 2002/0143439 A1 | 10/2002 | Morizet et al. | | |
| 2005/0010359 A1 | 1/2005 | Qureshi | | |
| 2005/0283281 A1 * | 12/2005 | Hartmann et al. | | 701/4 |
| 2006/0247828 A1 | 11/2006 | Ardila et al. | | |
| 2007/0219679 A1 * | 9/2007 | Coulmeau | | 701/3 |
| 2007/0222643 A1 * | 9/2007 | Winkler | | 340/977 |
| 2008/0140272 A1 * | 6/2008 | Zadrozynski et al. | | 701/14 |
| 2008/0262664 A1 | 10/2008 | Schnell et al. | | |
| 2008/0300738 A1 | 12/2008 | Coulmeau et al. | | |
| 2010/0030401 A1 * | 2/2010 | Rogers et al. | | 701/3 |
| 2010/0168936 A1 * | 7/2010 | Caillaud et al. | | 701/5 |
| 2011/0010082 A1 * | 1/2011 | Wilson et al. | | 701/200 |

OTHER PUBLICATIONS

European Patent Office, European Examination Report for Application No. 11 154 576.0 dated Oct. 16, 2012.
European Patent Office, European Search Report for Application No. 11 154 576.0 dated Oct. 4, 2012.

* cited by examiner

Primary Examiner — Khoi Tran
Assistant Examiner — Jason Holloway
(74) Attorney, Agent, or Firm — Ingrassia Fisher & Lorenz, P.C.

(57) ABSTRACT

Methods and systems are provided for presenting operating information for an aircraft in a vertical profile displayed on a display device associated with the aircraft. The vertical profile graphically depicts at least a portion of a flight plan for the aircraft, wherein the portion of the flight plan comprises a plurality of reference points. The method comprises calculating, for each reference point of the plurality of reference points, a predicted value of a first operating parameter for the aircraft at the respective reference point based at least in part on current status information for the aircraft, resulting in predicted values for the first operating parameter, and displaying the predicted values for the first operating parameter in the vertical profile.

19 Claims, 7 Drawing Sheets

METHODS AND SYSTEMS FOR DISPLAYING PREDICTED DOWNPATH PARAMETERS IN A VERTICAL PROFILE DISPLAY

TECHNICAL FIELD

The subject matter described herein relates generally to avionics systems, and more particularly, embodiments of the subject matter relate to avionics systems and related cockpit displays adapted for displaying predicted downpath values for one or more operating parameters in a vertical profile.

BACKGROUND

In general, when operating an aircraft, it is desirable to minimize costs or otherwise maximize the efficiency of operation while ensuring the safety of operation. Various strategic parameters, such as, for example, optimum altitude, maximum range speed, and the like, may be utilized to achieve more efficient operation of the aircraft without compromising safety of operation (e.g., due to insufficient fuel). In practice, these strategic parameters are optimized using a desired cost function to achieve a desired level of performance (e.g., a desired tradeoff between fuel usage, flight time, and other costs).

Some prior art systems calculate and display optimized values for various strategic parameters at an instant in time. However, these systems fail to provide information regarding how these optimized strategic parameters are expected to vary during operation of the aircraft as various aircraft parameters (e.g., altitude, speed, gross weight, and the like) change during operation. Additionally, much of the display area on the electronic display in an aircraft is already utilized or reserved for other display processes (e.g., navigational maps, profile views, synthetic vision displays, flight management windows, and the like). Thus, there is limited available space to display the optimized values for the strategic parameters without interfering with or otherwise obscuring these other display processes.

BRIEF SUMMARY

A method is provided for presenting operating information for an aircraft in a vertical profile displayed on a display device associated with the aircraft. The vertical profile graphically depicts at least a portion of a flight plan for the aircraft, wherein the portion of the flight plan comprises a plurality of reference points. The method comprises calculating, for each reference point of the plurality of reference points, a predicted value of a first operating parameter for the aircraft at the respective reference point based at least in part on current status information for the aircraft, resulting in predicted values for the first operating parameter, and displaying the predicted values for the first operating parameter in the vertical profile.

In another embodiment, a system onboard an aircraft is provided. The system comprises a display device and a flight management system coupled to the display device. The flight management system is configured to display a vertical profile display on the display device, the vertical profile display corresponding to an altitude profile for a portion of a flight plan for the aircraft, calculate, for each reference point of a plurality of reference points within the portion of the flight plan, a predicted value of a first operating parameter for the aircraft at the respective reference point based at least in part on current status information for the aircraft, resulting in predicted values for the first operating parameter, and display the predicted values for the first operating parameter in the vertical profile display.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

DETAILED DESCRIPTION

Figure 1:
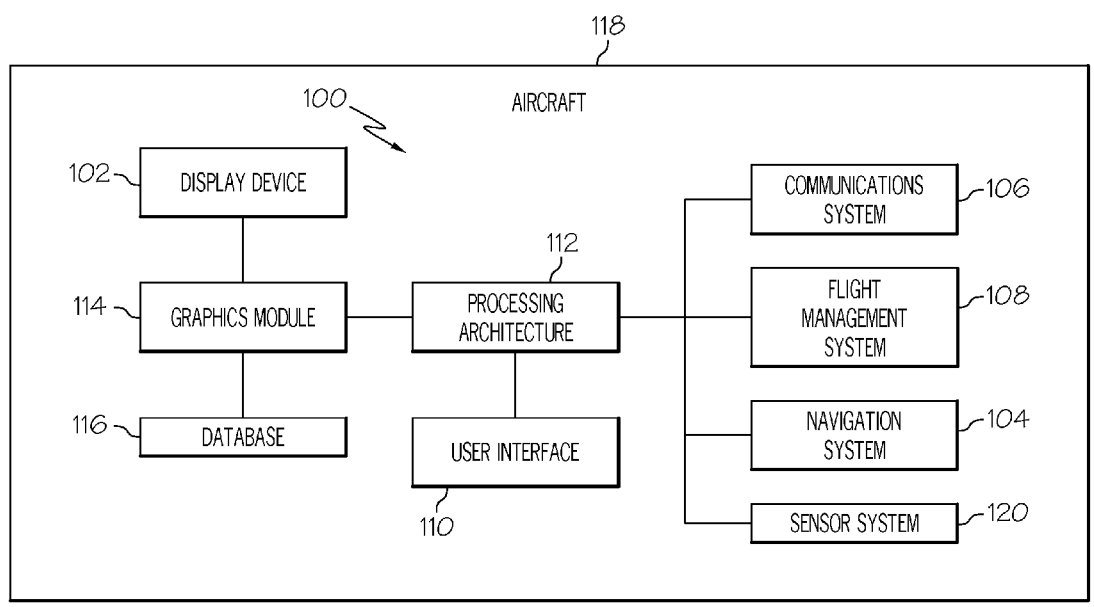
FIG. 1 is a block diagram of a display system suitable for use in an aircraft in accordance with one embodiment.

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first," "second" and other such numerical terms referring to structures do not imply a sequence or order unless clearly indicated by the context.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to display systems adapted for displaying, on a display device associated with an aircraft, downpath predicted values for one or more strategic operating parameters in a vertical profile for an aircraft. The downpath predicted values for selected strategic operating parameters for the upcoming portion of the flight plan are computed based at least in part on current and/or real-time status information for the aircraft, and then displayed on the vertical profile. Thus, a user, such as a pilot or crew member, may review and/or analyze the predicted values (and anticipated fluctuations thereof) for the strategic operating parameters during operation of an aircraft in a manner that does not degrade the situational awareness provided by the vertical profile, the navigational map or other display process, while improving the situational awareness regarding the selected strategic operating parameter(s).

FIG. 1 depicts an exemplary embodiment of a display system 100, which may be located onboard an aircraft 118. In an exemplary embodiment, the display system 100 includes, without limitation, a display device 102, a navigation system 104, a communications system 106, a flight management system 108 (FMS), a sensor system 120, a processing architecture 112, and a graphics module 114. The display system 100 may further include a user interface 110 for enabling interactivity with the display system 100 and a database 116 suitably configured to support operation of the display system 100, as described in greater detail below.

In an exemplary embodiment, the display device 102 is coupled to the graphics module 114. The graphics module 114 is coupled to the processing architecture 112, and the processing architecture 112 and the graphics module 114 are cooperatively configured to display, render, or otherwise convey one or more graphical representations or images associated with operation of the aircraft 118 on the display device 102, as described in greater detail below. The processing architecture 112 is coupled to the navigation system 104 for obtaining real-time navigational data and/or information regarding operation of the aircraft 118 to support operation of the display system 100. In an exemplary embodiment, the communications system 106 is coupled to the processing architecture 112 and configured to support communications to and/or from the aircraft 118, as described in greater detail below. The processing architecture 112 is also coupled to the flight management system 108, which in turn, is coupled to the navigation system 104 and the communications system 106 for providing real-time data and/or information regarding operation of the aircraft 118 to the processing architecture 112 to support operation of the display system 100. The sensor system 120 is coupled to the processing architecture 112 and/or flight management system 108 for obtaining real-time information regarding operation of the aircraft 118, as described in greater detail below. In an exemplary embodiment, the user interface 110 is coupled to the processing architecture 112, and the user interface 110 and the processing architecture 112 are cooperatively configured to allow a user to interact with the display device 102 and other elements of display system 100, as described in greater detail below.

In an exemplary embodiment, the display device 102 is realized as an electronic display configured to graphically display flight information or other data associated with operation of the aircraft 118 under control of the graphics module 114. In an exemplary embodiment, the display device 102 is located within a cockpit of the aircraft 118. It will be appreciated that although FIG. 1 shows a single display device 102, in practice, additional display devices may be present onboard the aircraft 118. In an exemplary embodiment, the user interface 110 is also located within the cockpit of the aircraft 118 and adapted to allow a user (e.g., pilot, co-pilot, or crew member) to interact with the display system 100 and enables a user to indicate, select, or otherwise manipulate content displayed on the display device 102, as described in greater detail below. In various embodiments, the user interface 110 may be realized as a keypad, touchpad, keyboard, mouse, touch panel (or touchscreen), joystick, microphone, or another suitable device adapted to receive input from a user. It should be appreciated that although FIG. 1 shows the display device 102 and the user interface 110 as being located within the aircraft 118, in some embodiments, the display device 102 and/or user interface 110 may be located outside the aircraft 118 (e.g., on the ground as part of an air traffic control center or another command center) and communicatively coupled to the remaining elements of the display system 100 (e.g., via a data link).

In an exemplary embodiment, the navigation system 104 is configured to obtain one or more navigational parameters associated with operation of the aircraft 118. The navigation system 104 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft 118, that is, the current location of the aircraft 118 (e.g., the latitude and longitude) and the altitude or above ground level for the aircraft 118. In some embodiments, the navigation system 104 may also obtain and/or determine the heading of the aircraft 118 (i.e., the direction the aircraft is traveling in relative to some reference).

In an exemplary embodiment, the communications system 106 is suitably configured to support communications between the aircraft 118 and another aircraft or ground location (e.g., air traffic control, navigational ground stations, and the like). In this regard, the communications system 106 may be realized using a radio communication system or another suitable data link system. The sensor system 120 includes one or more sensors configured to sense or otherwise obtain real-time information regarding operation of the aircraft 118, such as, for example, the current amount of fuel remaining onboard the aircraft 118, the current fuel flow rate, the airspeed of the aircraft 118, the current wind speed and/or wind direction proximate the aircraft 118, and the like.

In an exemplary embodiment, the flight management system 108 maintains information pertaining to a current flight plan (or alternatively, a route or travel plan). As used herein, a flight plan should be understood as a sequence of reference points that define a flight path or route for the aircraft 118. In an exemplary embodiment, the current flight plan comprises a flight plan that is either selected or otherwise designated for execution, selected for review on the display device 102, and/or currently being executed by the aircraft 118. Depending on the particular flight plan and type of air navigation being used, the reference points may comprise one or more of the following: navigational aids, such as VHF omni-directional ranges (VORs), distance measuring equipment (DMEs), tactical air navigation aids (TACANs), and combinations thereof (e.g., VORTACs), landing and/or departure locations (e.g., airports, airstrips, runways, landing strips, heliports, helipads, and the like), waypoints, points of interest, features on the ground, user-defined (or custom) waypoints (e.g., a particular latitude and longitude), beam intercept locations, itinerary termination points, performance termination points, as well as position fixes (e.g., initial approach fixes (IAFs) and/or final approach fixes (FAFs)) or other navigational reference points used in area navigation (RNAV). For example, a flight plan may include an initial or beginning reference point (e.g., a departure or takeoff location), a final reference point (e.g., an arrival or landing location), and one or more intermediate navigational reference points (e.g., waypoints, positional fixes, and the like) that define the desired flight path or route for the aircraft 118 from the initial reference point to the final reference point. The intermediate navigational reference points may define one or more airways for the aircraft 118 en route to the final reference point.

The processing architecture 112 generally represents the hardware, software, and/or firmware components configured to facilitate the display and/or rendering of operating information for the aircraft 118 on the display device 102 and perform additional tasks and/or functions described in greater detail below. Depending on the embodiment, the processing architecture 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processing architecture 112 may also be implemented as a combination of computing devices, e.g., a combination of a digital signal processor and a microprocessor, a plurality of microprocessors, one or more microprocessors in conjunction with a digital signal processor core, or any other such configuration. In practice, the processing architecture 112 includes processing logic that may be configured to carry out the functions, techniques, and processing tasks associated with the operation of the display system 100, as described in greater detail below. Although FIG. 1 depicts the processing architecture 112 and the flight management system 108 as separate elements, in some practical embodiments, the features and/or functionality of the processing architecture 112 may be implemented as part of the flight management system 108. Furthermore, the steps of a method or algorithm described in connection with the embodiments disclosed herein may be embodied directly in hardware, in firmware, in a software module executed by the processing architecture 112, or in any practical combination thereof.

The graphics module 114 generally represents the hardware, software, and/or firmware components configured to control the display and/or rendering of operating information for the aircraft 118 on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise a terrain database, an obstacle database, a navigational database, a geopolitical database, or other information for rendering and/or displaying content related to the current flight plan being reviewed on the display device 102, as described below.

It should be understood that FIG. 1 is a simplified representation of a display system 100 for purposes of explanation and ease of description, and FIG. 1 is not intended to limit the application or scope of the subject matter in any way. In practice, the display system 100 and/or aircraft 118 will include numerous other devices and components for providing additional functions and features, as will be appreciated in the art. For example, in practice, the flight management system 108 may be coupled to one or more additional modules or components as necessary to support navigation, flight planning, and other aircraft control functions in a conventional manner.

Figure 2:
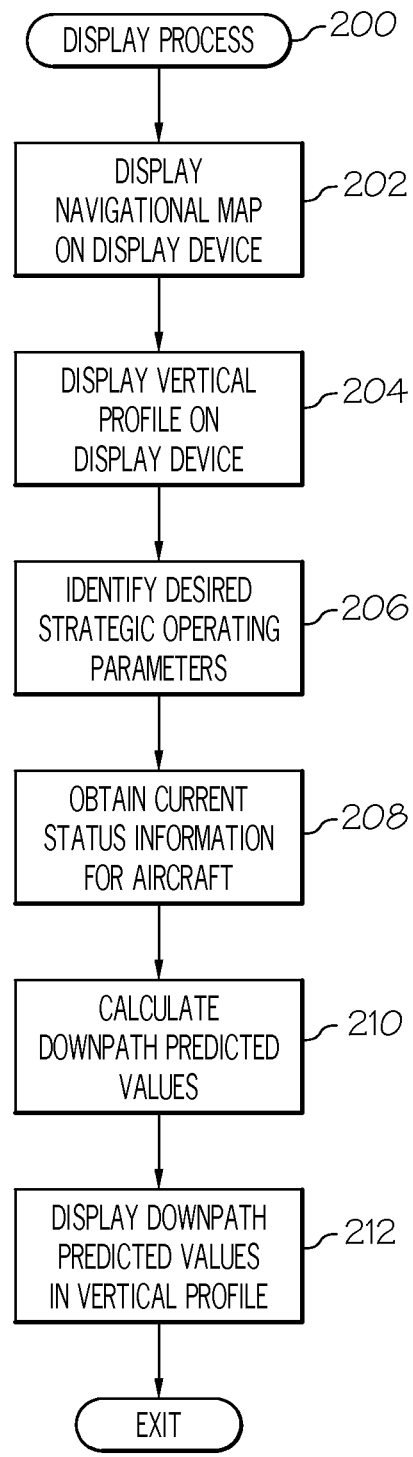
FIG. 2 is a flow diagram of an exemplary display process suitable for use with the display system of FIG. 1 in accordance with one embodiment.

Referring now to FIG. 2, in an exemplary embodiment, the display system 100 is configured to perform a display process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the navigation system 104, the communications system 106, the flight management system 108, the user interface 110, the processing architecture 112, the graphics module 114 and/or the database 116. It should be appreciated that any number of additional or alternative tasks may be included, and may be incorporated into a more comprehensive procedure or process having additional functionality not described in detail herein.

Referring again to FIG. 2, and with continued reference to FIG. 1, the display process 200 may be performed present predicted values for strategic operating parameters for an upcoming portion of a flight plan on a vertical profile displayed on a display device. This enables a user, such as a pilot or crew member, to review and/or analyze the predicted values (and fluctuations thereof) for the strategic operating parameters during operation of an aircraft. In an exemplary embodiment, the display process 200 initializes by displaying a navigational map relating to operation of the aircraft on a display device associated with the aircraft (task 202). For example, referring now to FIG. 3, and with continued reference to FIG. 1 and FIG. 2, the display process 200 may display and/or render a navigational map 300 associated with a current (or instantaneous) location of an aircraft on a display device 102 onboard the aircraft 118. In this regard, the graphics module 114 may be configured to control the rendering of the navigational map 300, which may be graphically displayed on the display device 102. The display process 200 may also be configured to render a graphical representation of the aircraft 302 on the map 300, which may be overlaid or otherwise rendered on top of a background 304. In an exemplary embodiment, the background 304 comprises a graphical representation of the terrain, topology, or other suitable items or points of interest corresponding to (or within a given distance of) a location of the aircraft 118, which may be maintained in a terrain database, a navigational database, a geopolitical database, or another suitable database (e.g., database 116).

Figure 3:
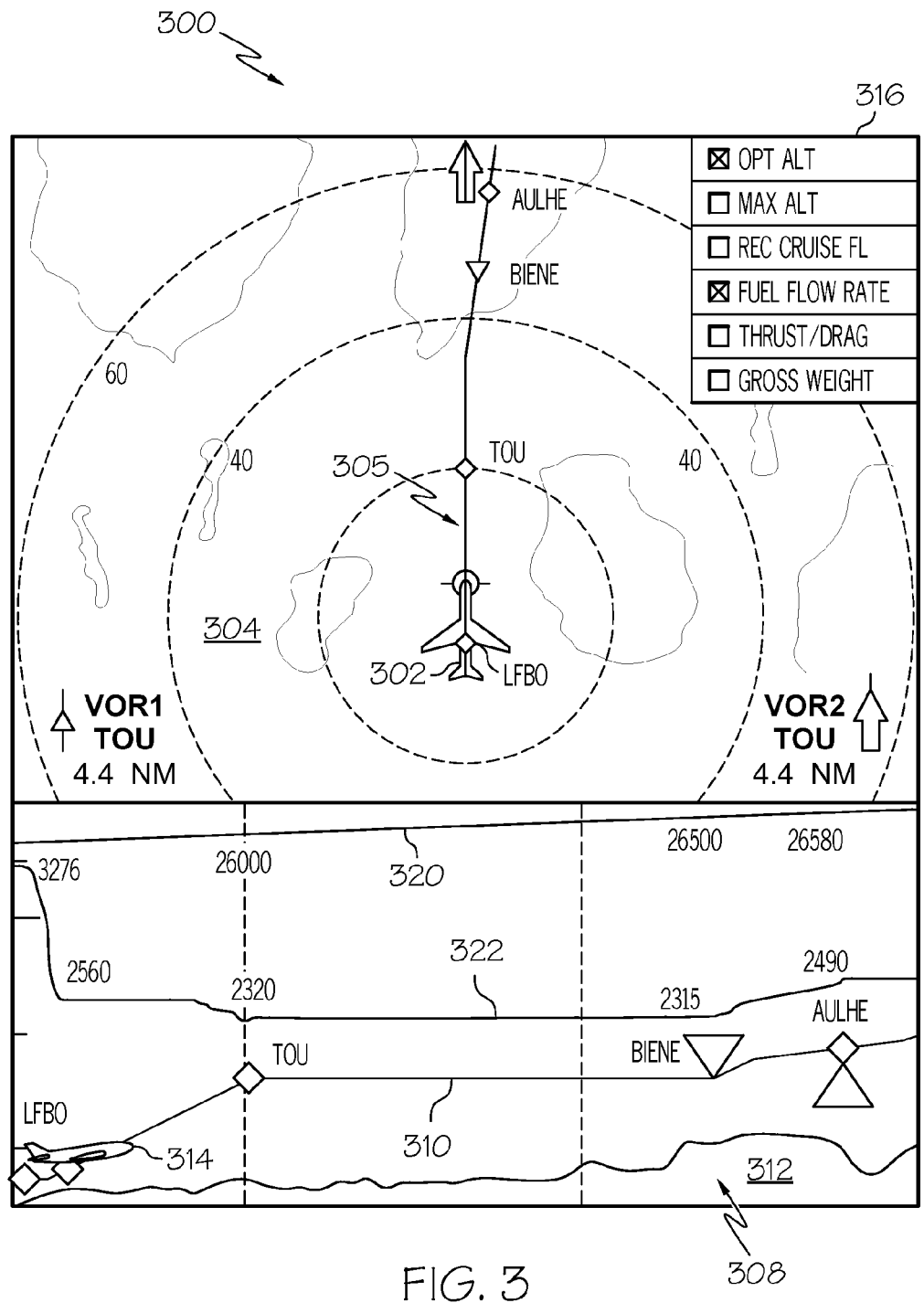
FIG. 3 is a schematic view of an exemplary navigational map including a vertical profile including an optimum altitude curve and a fuel flow rate curve suitable for use with the display process of FIG. 2 in accordance with one embodiment.

It should be appreciated that although the subject matter may be described herein in the context of a navigational map, the subject matter is not intended to be limited to a particular type of content displayed on the display device and the display process 200 may be implemented with other types of content, such as, for example, an airport map or terminal map. Although FIG. 3 depicts a top view (e.g., from above the aircraft 302) of the navigational map 300, in practice, alternative embodiments may utilize various perspective views, such as three-dimensional views (e.g., a three-dimensional synthetic vision display), angular or skewed views, and the like. Depending on the embodiment, the aircraft 302 may be shown as traveling across the map 300, or alternatively, as being located at a fixed position on the map 300, and FIG. 3 is not intended to limit the scope of the subject matter in any way. In an exemplary embodiment, the map 300 is associated with the movement of the aircraft, and the background 304 refreshes or updates as the aircraft travels, such that the graphical representation of the aircraft 302 is positioned over the terrain background 304 in a manner that accurately reflects the current (e.g., instantaneous or substantially real-time) real-world positioning of the aircraft 118 relative to the earth. In accordance with one embodiment, the map 300 is updated or refreshed such that it is centered on and/or aligned with the aircraft 302. Depending on the embodiment, the navigational map 300 may be oriented north-up (i.e., moving upward on the map 300 corresponds to traveling northward) or track-up or heading-up (i.e., aligned such that the aircraft 302 is always traveling in an upward direction and the background 304 adjusted accordingly), as will be appreciated in the art. As shown in FIG. 3, the navigational map 300 may also include a graphical representation of the flight path 305 defined by the current flight plan for the aircraft 302.

In an exemplary embodiment, the display process 200 continues by displaying a vertical profile (or alternatively, a vertical profile display or vertical situation display) on the display device (task 204). Depending on the embodiment, the vertical profile may be rendered and/or displayed overlying the content displayed on the display device or adjacent to the content displayed on the display device. For example, as shown in FIG. 3, the vertical profile 308 may be rendered and/or displayed overlying (or adjacent to) the bottom (or lower) portion of the navigational map 300. It should be appreciated that in other embodiments, the vertical profile 308 may be rendered and/or displayed overlying (or adjacent to) the top (or upper) portion of the displayed content (e.g., navigational map 300), and the subject matter is not intended to be limited to any particular arrangement of the vertical profile with respect to other displayed content.

In an exemplary embodiment, the vertical profile comprises a graphical representation of the altitude profile for the portion of the flight plan for the aircraft that is displayed in the vertical profile. For example, as shown in FIG. 3, in accordance with one or more embodiments, the vertical profile 308 comprises a graphical representation of the portion of the flight plan 305 for the aircraft 302 that is concurrently displayed on a corresponding navigational map 300. In this regard, the horizontal dimension of the vertical profile 308 may correspond to the real-world horizontal along-track distance for the portion of the flight plan 305 displayed in the navigational map 300. In an exemplary embodiment, the flight management system 108 and/or processing architecture 112 determines a forward predicted trajectory that comprises the altitude profile for the displayed portion of the flight plan using predicted altitudes of the aircraft 118 for when the location of the aircraft 118 traverses or otherwise corresponds to upcoming reference points of the flight plan while accounting for any speed constraints (e.g., a maximum speed) and/or altitude constraints (e.g., minimum altitude) at the upcoming reference points. The flight management system 108 may determine the forward predicted trajectory, for example, by determining lateral and vertical profiles of the flight plan, subdividing the flight plan into flight phases (e.g., takeoff, climb, cruise, descent, approach, and the like), subdividing the flight phases into segments defined by reference points of the flight plan, and determining and/or predicting the altitude of the aircraft 118 along each segment of the flight plan based at least in part on one or more of the following: the anticipated flight phase for the segment, the anticipated aerodynamic state (e.g., the anticipated thrust, drag, and/or lift) of the aircraft 118 in that flight phase, anticipated atmospheric conditions (e.g., wind speed, wind bearing, temperature, atmospheric pressure, tropopause pressure, tropopause temperature, etc.) along that segment, and any applicable trajectory rules (e.g., thrust constraints, speed constraints, altitude constraints, and the like). The predicted altitudes of the aircraft 118 at the upcoming reference points of the flight plan may then be determined from the forward predicted trajectory. As shown in FIG. 3, after determining the forward predicted trajectory, the display process 200 renders a graphical representation of the forward predicted trajectory 310 in the vertical profile 308. In some embodiments, the display process 200 may also display and/or render a graphical representation of terrain 312 associated with the vertical profile, that is, the altitude (or elevation) profile of the terrain underlying the flight plan 305 and/or forward predicted trajectory 310.

In an exemplary embodiment, the display process 200 also displays and/or renders a graphical representation of the aircraft 314 within the vertical profile 308. In this regard, the display process 200 may obtain the instantaneous position (e.g., location and altitude) of the aircraft and display and/or render a graphical representation of the aircraft 314 corresponding to the aircraft's position in the vertical profile 308. For example, as shown in the navigational map 300 of FIG. 3, the aircraft 302 has just traversed the LFBO reference point of the flight plan 305, and thus, a second graphical representation of the aircraft 314 is rendered and/or displayed in the vertical profile 308 and positioned horizontally within the vertical profile 308 such that the position of the aircraft 314 corresponds to the relative real-world position of the aircraft between the LFBO reference point and a subsequent reference point of the flight plan (e.g., the TOU reference point). In an exemplary embodiment, the aircraft 314 is positioned vertically such that it corresponds to the instantaneous altitude of the aircraft. In this manner, the aircraft 314 is vertically and horizontally positioned with respect to the terrain 312 in a manner that reflects the relative real-world positioning of the aircraft with respect to the underlying real-world terrain. The display process 200 may continue to update the positioning of the aircraft 302, 314 with respect to the terrain 304, 312 as the aircraft travels.

In an exemplary embodiment, the display process 200 continues by identifying one or more strategic operating parameters to be displayed in the vertical profile (task 206). As used herein, a strategic operating parameter should be understood as referring to a parameter, variable, or other criterion that relates to the efficiency of the operation of the aircraft.

Depending on the embodiment, the value of the strategic operating parameter may be optimized using a cost function in order to satisfy particular performance requirements or to otherwise achieve a desired level of performance. In this regard, the cost function may specify a desired tradeoff between fuel usage, flight time and/or other costs, for example, to minimize overall cost, minimize fuel usage, minimize flight time, or achieve an optimal combination of fuel usage, flight time, distance (or range), and the like.

In some embodiments, the strategic operating parameter may comprise an altitude criterion for the aircraft, such as, for example, an altitude that is optimized based on a particular cost function (e.g., optimum altitude, recommended cruise flight level, optimum step altitude, or the like), a maneuver limit altitude, a level off altitude, or an altitude that is otherwise optimized to satisfy particular performance requirements (e.g., maximum altitude, engine out maximum altitude, theoretical descent path altitude, or the like). In this regard, the optimized altitude criterion represents the altitude that achieves the desired tradeoff (e.g., satisfies the cost function) or otherwise satisfies particular performance requirements at a given location (e.g., a reference point) within the flight plan. In other embodiments, the strategic operating parameter may comprise a speed criterion for the aircraft, such as, for example, a speed that is optimized based on a particular cost function or a speed that is otherwise optimized to satisfy particular performance requirements (e.g., maximum operating speed, stall speed, maximum range speed, maximum endurance speed, or other safety and/or operational envelope speeds). In yet other embodiments, the strategic operating parameter may comprise the fuel flow rate, the fuel remaining, the difference between the thrust and drag (or thrust/drag variation), or the gross weight.

As shown in FIG. 3, in an exemplary embodiment, the display process 200 is configured to display and/or render a graphical user interface element 316, such as a pop-up menu, that comprises a list of possible strategic operating parameters. For example, in the illustrated embodiment, the menu 316 includes a list of possible strategic operating parameters comprising optimum altitude (OPT ALT) which corresponds to an altitude criterion optimized for a particular cost function, maximum altitude (MAX ALT) which corresponds to an altitude criterion optimized to satisfy particular performance requirements, a recommended cruise flight level (REC CRUISE FL) which corresponds to an optimal cruise flight level, fuel flow rate for the aircraft, thrust/drag variation, and the gross weight of the aircraft. A user may manipulate the user interface 110 and indicate or otherwise select one or more strategic operating parameters from the menu 316 to be displayed on the vertical profile 308, for example, by positioning a cursor or pointer over a desired strategic operating parameter and clicking or otherwise selecting the strategic operating parameter from the list. For example, as shown in FIG. 3, the user may select the optimum altitude and the fuel flow rate for display in the vertical profile 308. In alternative embodiments, the display process 200 may automatically identify strategic operating parameters to be displayed in the vertical profile, for example, based on the current flight phase and/or operating state of the aircraft, based on the most frequently selected strategic operating parameter(s), or based on the most recently selected strategic operating parameter(s).

Referring again to FIG. 2, in an exemplary embodiment, the display process 200 continues by obtaining current status information for the aircraft (task 208). In this regard, the current status information comprises substantially real-time values for various operating parameters of the aircraft, such as, for example, the current altitude of the aircraft, the current location of the aircraft, the current gross weight of the aircraft, the current amount of fuel remaining onboard the aircraft, the current airspeed of the aircraft, the current heading of the aircraft, the current aerodynamic state of the aircraft anticipated flight phase for the segment, the current atmospheric conditions (e.g., wind speed, wind bearing, temperature, etc.) at the current location and/or altitude of the aircraft. The current status information for the aircraft 118 is obtained from the sensor system 120, the navigation system 104 and/or the flight management system 108.

In an exemplary embodiment, the display process 200 continues by calculating or otherwise determining downpath predicted values for the selected strategic operating parameter(s) in a manner that is influenced by the current status information for the aircraft and displaying the downpath predicted values for the selected strategic parameter(s) on the vertical profile (tasks 210, 212). In this regard, the downpath predicted values for a strategic operating parameter comprise predicted, anticipated, or otherwise estimated values for the strategic operating parameter at locations (e.g., reference points) within the current flight plan that are ahead of (or forward from) the current location of the aircraft with respect to the flight plan. Additionally, in accordance with one or more embodiments, the display process 200 may calculate or otherwise determine one or more pseudo-reference points between downpath reference points of the flight plan (e.g., by interpolating between adjacent reference points of the flight plan) and determine downpath predicted values of selected strategic operating parameter(s) at the pseudo-reference points. In an exemplary embodiment, for each reference point (or pseudo-reference point) of the flight plan that is downpath from the current location of the aircraft, the display process 200 calculates a predicted value of selected strategic operating parameter(s) at the respective reference point based at least in part on current status information for the aircraft. In this manner, as current status information for the aircraft changes during flight, the downpath predicted values for the selected strategic operating parameter(s) may vary dynamically to reflect the most recent status information for the aircraft. Thus, when the vertical profile 308 is updated (e.g., in response to sufficient change in the aircraft location and/or altitude or after a predetermined amount of time), the downpath predicted values for the selected strategic operating parameter(s) may be updated to reflect changes to the current status information of the aircraft, thereby presenting accurate downpath predicted values for the selected strategic operating parameter(s) as the aircraft travels. In some embodiments, the display process 200 may calculate predicted values of selected strategic operating parameter(s) only for reference points and/or pseudo-reference points corresponding to the portion of the flight plan displayed in the vertical profile 308 (e.g., reference points and/or pseudo-reference points that are within sufficient distance of the aircraft to be displayed in the vertical profile 308).

In an exemplary embodiment, the display process 200 displays the downpath predicted values for the selected strategic operating parameter(s) by performing a curve-fitting technique to construct a curve through the downpath predicted values (e.g., by performing least squares or another regression analysis method) for a respective strategic operating parameter, and displaying the curve on the vertical profile. For example, in the illustrated embodiment of FIG. 3, the display process 200 calculates downpath predicted values for the optimum altitude of the aircraft and displays a curve 320 corresponding to the optimum altitude. In this regard, for each downpath location (e.g., a reference point and/or pseudo-reference point of the flight plan) from the current location of the aircraft 302, 314, the display process 200 calculates or otherwise determines an altitude criterion for the respective downpath location that satisfies a particular cost function (e.g., to minimize costs) based at least in part on one or more of the following: the current aircraft altitude, the current aircraft gross weight, the current aircraft center of gravity, the ISA temperature deviation at the current location of the aircraft, the ceiling altitude for the aircraft at the current location of the aircraft, and the tropopause altitude at the current location of the aircraft, the anticipated flight phase for the aircraft at the respective downpath location, the anticipated aerodynamic state of the aircraft at the respective downpath location, and the anticipated atmospheric conditions at the respective downpath location. The display process 200 may then perform a curve-fitting technique to obtain the optimum altitude curve 320 and display the optimum altitude 320 on the vertical profile 308 concurrently with the forward predicted trajectory 310. As described above, the current status information (e.g., the current aircraft altitude, the current aircraft gross weight, the current aircraft center of gravity, the ISA temperature deviation at the current location of the aircraft) for the aircraft 118 may obtained from the sensor system 120, the navigation system 104 and/or the flight management system 108.

Additionally, in the illustrated embodiment of FIG. 3, the display process 200 calculates downpath predicted values for the fuel flow rate of the aircraft and displays a curve 322 corresponding to the fuel flow rate. In this regard, for each downpath reference point and/or pseudo-reference point from the current location of the aircraft 302, 314, the display process 200 calculates or otherwise determines a predicted fuel flow for the respective reference point based at least in part on one or more of the following: the current aircraft gross weight, the current aerodynamic state of the aircraft, the anticipated flight phase for the aircraft at the respective downpath location (e.g., the flight phase for the segment preceding and/or traversing the respective downpath reference point), the anticipated aerodynamic state of the aircraft at the respective downpath location, and the anticipated atmospheric conditions at the respective downpath location. The display process 200 may then perform a curve-fitting technique to obtain the fuel flow curve 322 and display the fuel flow curve 322 on the vertical profile 308 concurrently with the forward predicted trajectory 310 and the optimum altitude curve 320. As described in greater detail below in the context of FIG. 4, the downpath predicted values for a respective strategic operating parameter may be displayed and/or rendered with respect to a vertical axis associated with the respective strategic operating parameter, wherein the scale of the vertical axis is configured such that the curve corresponding to the downpath predicted values is not truncated and/or cutoff at the top and/or bottom of the vertical profile 308.

Figure 4:
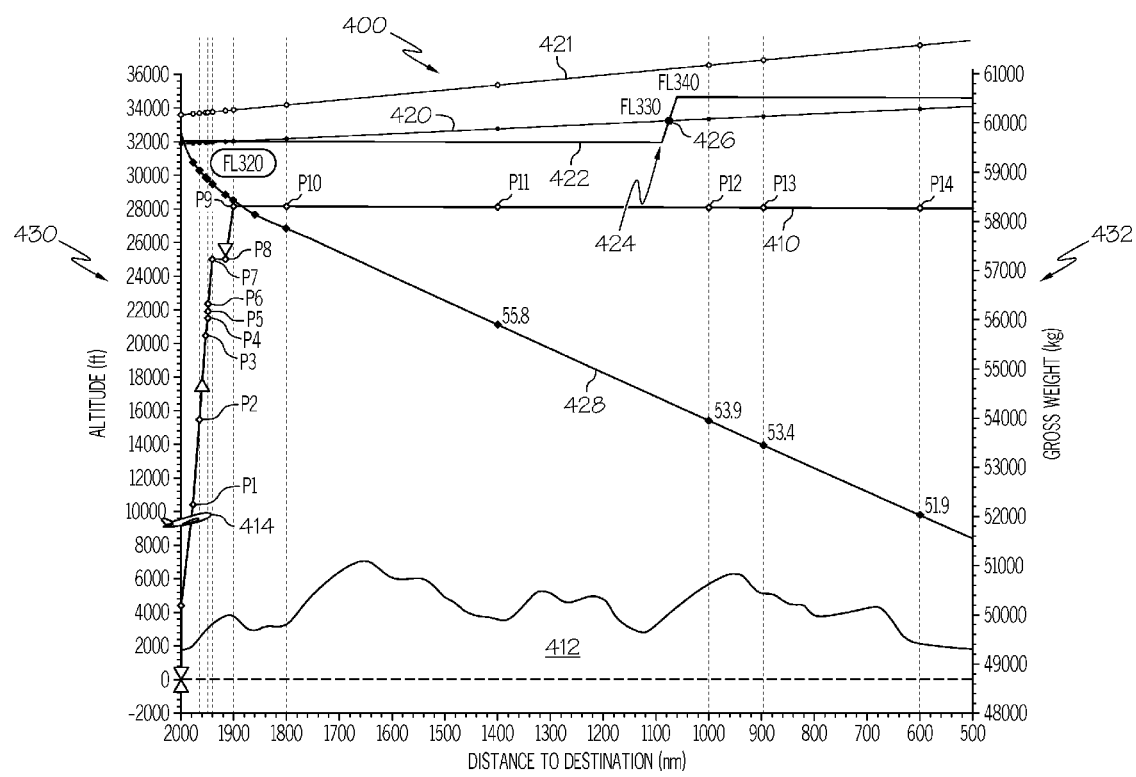
FIG. 4 is a schematic view of an exemplary navigational map including a vertical profile including an optimum altitude curve, a recommended cruise flight level curve, and a gross weight curve suitable for use with the display process of FIG. 2 in accordance with one embodiment.

FIG. 4 depicts another exemplary embodiment of a vertical profile 400 suitable for display on a display device (e.g., display device 102). The embodiment of FIG. 4 illustrates the display process 200 in response to identifying the optimum altitude, the recommended cruise flight level, the maximum altitude, and the gross weight of the aircraft as the strategic operating parameters to be displayed on the vertical profile 400 (e.g., task 206). The vertical profile 400 may be displayed on the display device 102 proximate a navigational map (e.g., navigational map 300) or other suitable content as described above. As shown, the vertical profile 400 includes a forward predicted trajectory 410 based on the flight plan for the aircraft, as well as a graphical representation of the terrain 412 underlying the forward predicted trajectory 410, in a similar manner as described above. In an exemplary embodiment, the vertical profile 400 also includes a graphical representation of the aircraft 414 that is positioned with respect to the forward predicted trajectory 410 and the terrain 412 in a manner that accurately reflects the real-time altitude and location of the aircraft.

As described above, the flight management system 108 and/or processing architecture 112 obtains the current status information for the aircraft, and for each reference point (or pseudo-reference point) of the flight plan that is downpath from the current location of the aircraft 414 (e.g., points P1-P14), calculates or otherwise determines predicted values for the selected strategic parameters. In this regard, the optimum altitude comprises an altitude criterion for a respective reference point that satisfies a particular cost function and is determined based at least in part on one or more of the following: the current aircraft altitude, the current aircraft gross weight, the current aircraft center of gravity, the ISA temperature deviation at the current location of the aircraft, the ceiling altitude for the aircraft at the current location of the aircraft, and the tropopause altitude at the current location of the aircraft, the anticipated flight phase for the aircraft at the respective reference point, the anticipated aerodynamic state of the aircraft at the respective reference point, and the anticipated atmospheric conditions at the respective reference point.

The recommended cruise flight level comprises a cruise flight level at a respective reference point (or pseudo-reference point) that satisfies a particular cost function and is determined based at least in part on one or more of the following: the current aircraft altitude, the current aircraft gross weight, the current aircraft center of gravity, the ISA temperature deviation at the current location of the aircraft, the ceiling altitude for the aircraft at the current location of the aircraft, and the tropopause altitude at the current location of the aircraft, the anticipated flight phase for the aircraft at the respective reference point, the anticipated aerodynamic state of the aircraft at the respective reference point, and the anticipated atmospheric conditions at the respective reference point, while accounting for flight level restrictions and the predicted or anticipated wind parameters (e.g., wind speed and wind bearing) at the downpath reference points and/or pseudo-reference points. In this regard, the flight management system 108 and/or processing architecture 112 may obtain measured wind parameters for downpath reference points (e.g., via communications system 106), and interpolate the measured wind parameters to obtain predicted wind parameters for the downpath reference points and/or pseudo-reference points as a function of the location and altitude at a respective reference point and/or pseudo-reference point. The flight management system 108 and/or processing architecture 112 then calculates predicted values for the recommended cruise flight level using a cost function that accounts for the predicted downpath wind parameters.

The maximum altitude comprises a maximum altitude at a respective reference point (or pseudo-reference point) that satisfies a particular cost function and is determined based at least in part on one or more of the following: the current aircraft altitude, the current aircraft gross weight, the ISA temperature deviation at the current location of the aircraft, the ceiling altitude for the aircraft at the current location of the aircraft, and the tropopause altitude at the current location of the aircraft, the anticipated flight phase for the aircraft at the respective reference point, the anticipated aerodynamic state of the aircraft at the respective reference point, and the anticipated atmospheric conditions at the respective reference point. The predicted values for the gross weight of the aircraft are calculated based at least in part on the current aircraft gross weight, the current aerodynamic state of the aircraft, the current fuel flow rate the anticipated flight phase for the aircraft at the respective downpath reference point, the anticipated aerodynamic state of the aircraft at the respective downpath reference point, and the anticipated fuel flow rate at the respective downpath reference point.

As described above, after calculating or otherwise determining predicted values for the selected strategic operating parameters, the display process 200 continues by displaying the predicted values for the selected strategic operating parameters on the vertical profile 400 (e.g., task 210). As shown in FIG. 4 and described above, the display process 200 performs a curve-fitting technique to obtain the optimum altitude curve 420 and displays the optimum altitude curve 420 on the vertical profile 400 concurrently with the forward predicted trajectory 410. Similarly, the display process 200 performs a curve-fitting technique to obtain the maximum altitude curve 421 and displays the maximum altitude curve 421 on the vertical profile 400 concurrently with the forward predicted trajectory 410 and the optimum altitude curve 420.

In an exemplary embodiment, the display process 200 performs a curve-fitting technique to obtain the recommended cruise flight level curve 422 and displays the recommended cruise flight level curve 422 on the vertical profile 400 concurrently with the forward predicted trajectory 410 and the optimum altitude curve 420. In an exemplary embodiment, the curve-fitting technique for obtaining the recommended cruise flight level curve 422 accounts for the maximum rate of ascent for the aircraft at the particular altitude and/or speed, such that the recommended cruise flight level curve 422 provides an accurate and reliable indication of an optimal location where the pilot of the aircraft 414 should initiate an ascent and/or descent to another flight level. Thus, the location 424 where the recommended cruise flight level curve 422 transitions from a lower flight level (FL320) to a higher flight level (FL340) provides an accurate and reliable indication of the optimal location where the pilot of the aircraft 414 should initiate the transition to the higher flight level. In this regard, a location where the recommended cruise flight level curve 422 intersects the optimum altitude curve 420 comprises a predicted optimum step point for the aircraft, wherein the display process 200 may graphically indicate the predicted optimum step point 426 on the vertical profile 408.

In a similar manner, the display process 200 performs a curve-fitting technique to obtain the predicted gross weight curve 428 and displays the gross weight curve 428 on the vertical profile 400 concurrently with the forward predicted trajectory 410, the optimum altitude curve 420, the maximum altitude curve 421, and the recommended cruise flight level curve 422. As shown in FIG. 4, in an exemplary embodiment, because the predicted values for the gross weight have a different unit of measurement than predicted values for the forward predicted trajectory, the optimum altitude, the maximum altitude, and the recommended cruise flight level, the display process 200 displays and/or renders the vertical profile 400 with a first vertical axis 430 corresponding to the forward predicted trajectory 410, the optimum altitude curve 420, the maximum altitude curve 421, and the recommended cruise flight level curve 422, and a second vertical axis 432 corresponding to the gross weight curve 428. In this regard, the forward predicted trajectory 410, the optimum altitude curve 420, the maximum altitude curve 421, and the recommended cruise flight level curve 422 are displayed concurrently with respect to the same vertical axis and the same horizontal axis, such that the forward predicted trajectory 410, the optimum altitude curve 420, the maximum altitude curve 421, and the recommended cruise flight level curve 422 each have the same vertical scale and horizontal scale. In an exemplary embodiment, the display process 200 determines the scale of the first vertical axis 430 to accommodate the range of values for the downpath predicted values of the optimum altitude and the recommend cruise flight level and taking into account the forward predicted trajectory 410 such that the forward predicted trajectory 410, the optimum altitude curve 420, the maximum altitude curve 421, and the recommended cruise flight level curve 422 are displayed without being truncated or otherwise cutoff at the top and/or bottom of the vertical profile 400. The forward predicted trajectory 410, the optimum altitude curve 420, the maximum altitude curve 421, the recommended cruise flight level curve 422, and the gross weight curve 428 are displayed concurrently with respect to the same horizontal axis, however, the gross weight curve 428 is displayed and/or rendered with respect to a different vertical axis. In this manner, the display process 200 may determine the scale of the second vertical axis 432 to accommodate the range of values for the downpath predicted values of the gross weight such that the gross weight curve 428 is not truncated and/or cutoff at the top and/or bottom of the vertical profile 400. Thus, the gross weight curve 428 may have the same horizontal scale as the forward predicted trajectory 410, the optimum altitude curve 420, the maximum altitude curve 421, and the recommended cruise flight level curve 422 but a different vertical scale.

Figure 5:
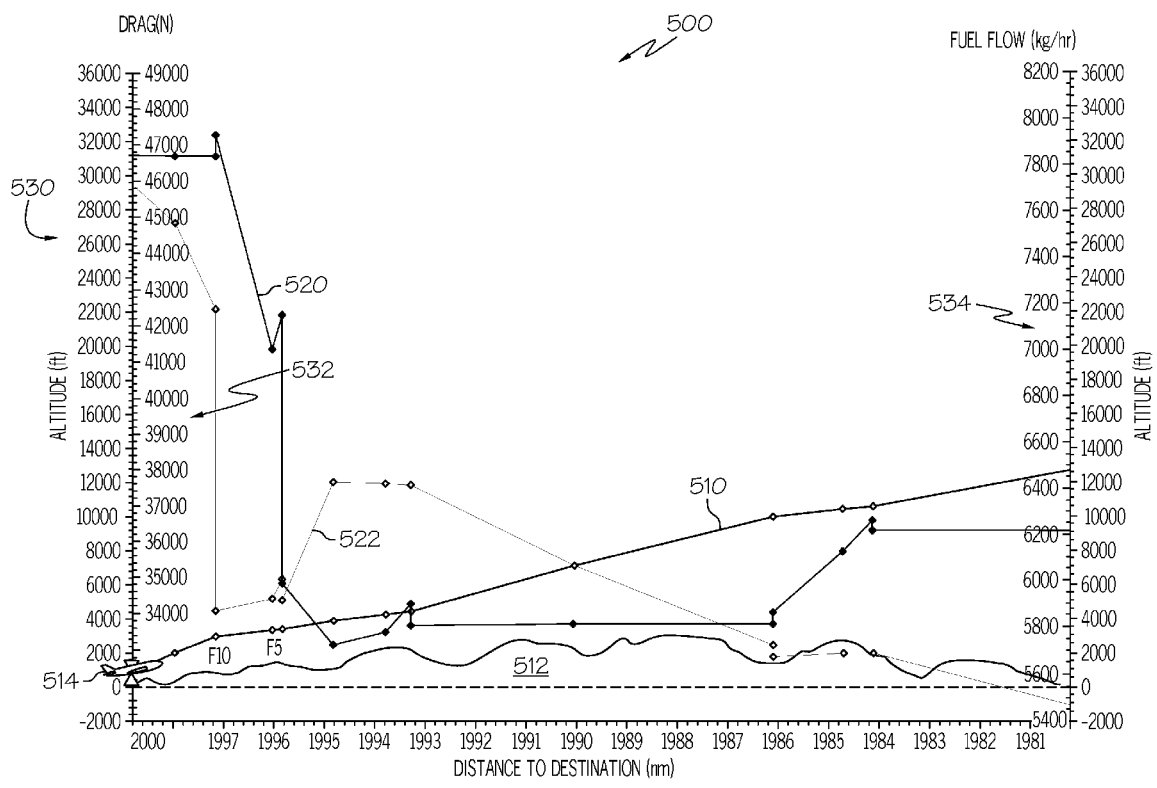
FIG. 5 is a schematic view of an exemplary navigational map including a vertical profile including a drag curve and a fuel flow rate curve suitable for use with the display process of FIG. 2 in accordance with one embodiment.

FIG. 5 depicts another exemplary embodiment of a vertical profile 500 suitable for display on a display device (e.g., display device 102). The vertical profile 500 may be displayed on the display device 102 proximate a navigational map (e.g., navigational map 300) or other suitable content as described above. As shown, the vertical profile 500 includes a forward predicted trajectory 510 based on the flight plan for the aircraft, as well as a graphical representation of the terrain 512 underlying the forward predicted trajectory 510, in a similar manner as described above. In an exemplary embodiment, the vertical profile 500 also includes a graphical representation of the aircraft 514 that is positioned with respect to the forward predicted trajectory 510 and the terrain 512 in a manner that accurately reflects the real-time altitude and location of the aircraft.

The embodiment of FIG. 5 illustrates the display process 200 in response to identifying the fuel flow rate and the drag of the aircraft as the strategic operating parameters to be displayed on the vertical profile 500 (e.g., task 206). As described above, the flight management system 108 and/or processing architecture 112 obtains the current status information for the aircraft, and for each reference point and/or pseudo-reference point of the flight plan that is downpath from the current location of the aircraft 514, calculates or otherwise determines predicted values for the fuel flow rate and the drag of the aircraft. The predicted values for the fuel flow rate are calculated as described above in the context of FIG. 3. In an exemplary embodiment, the predicted values for the drag of the aircraft are calculated based at least in part on one or more of the following: the current aircraft gross weight, the current aircraft center of gravity, the current flight phase and/or aerodynamic state of the aircraft, the wind parameters (e.g., wind speed and wind bearing) at the current location of the aircraft, the anticipated flight phase for the aircraft at the respective downpath location, the anticipated aerodynamic state of the aircraft at the respective downpath location, and the anticipated wind parameters (e.g., wind speed and wind bearing) at the respective reference point (or pseudo-reference point).

As described above, after calculating or otherwise determining predicted values for the selected strategic operating parameters, the display process 200 continues by displaying the predicted values for the selected strategic operating parameters on the vertical profile 500 (e.g., task 210). In the illustrated embodiment of FIG. 5, the display process 200 constructs a drag curve 520 by connecting a plurality of line segments between downpath predicted drag values in a piecewise linear manner and constructs a fuel flow rate curve 522 by connecting a plurality of line segments between downpath predicted fuel flow rate values in a piecewise linear manner. As shown in FIG. 5, in an exemplary embodiment, the display process 200 displays and/or renders the vertical profile 500 with a first vertical axis 530 corresponding to the forward predicted trajectory 510, a second vertical axis 532 corresponding to the drag curve 520, and a third vertical axis 534 corresponding to the fuel flow rate curve 522 because the forward predicted trajectory values, the drag values, and the fuel flow rate values each have different units of measurement. In this regard, the forward predicted trajectory 510, the drag curve 520, and the fuel flow rate curve 522 are displayed concurrently with respect to the same horizontal axis with each having a different vertical axis 530, 532, 534. Additionally, the curves 510, 520, 522 may each be displayed in a different color to further aid in distinguishing between the curves 510, 520, 522, the each axis 530, 532, 534 may be displayed in a corresponding color to further aid in associating a curve 510, 520, 522 with the appropriate axis 530, 532, 534. For example, the forward predicted trajectory 510 and axis 530 may be displayed in a first color, the drag curve 520 and axis 532 may be displayed in a second color, and the fuel flow rate curve 522 and axis 534 may be displayed in a third color.

Figure 6:
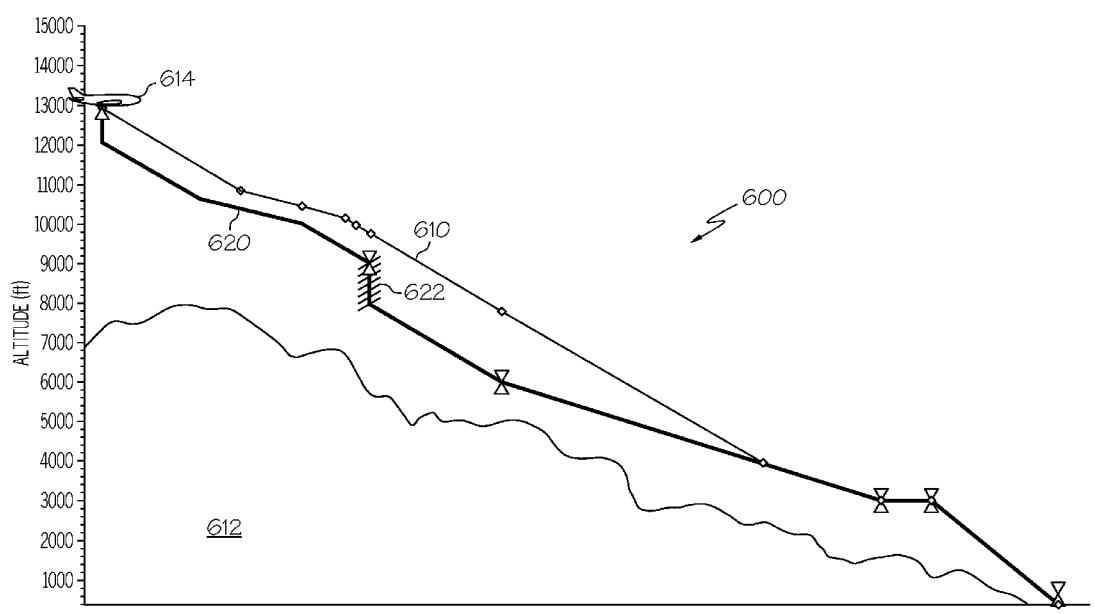
FIG. 6 is a schematic view of an exemplary navigational map including a vertical profile including a theoretical descent path for use with the display process of FIG. 2 in accordance with one embodiment.

FIG. 6 depicts another exemplary embodiment of a vertical profile 600 suitable for display on a display device (e.g., display device 102) proximate a navigational map (e.g., navigational map 300) or other suitable content. As shown, the vertical profile 600 includes a forward predicted trajectory 610 based on the flight plan for the aircraft, as well as a graphical representation of the terrain 612 underlying the forward predicted trajectory 610, in a similar manner as described above. In an exemplary embodiment, the vertical profile 600 also includes a graphical representation of the aircraft 614 that is positioned with respect to the forward predicted trajectory 610 and the terrain 612 in a manner that accurately reflects the real-time altitude and location of the aircraft.

The embodiment of FIG. 6 illustrates the display process 200 in response to identifying the theoretical descent path altitude as the strategic operating parameter to be displayed on the vertical profile 600 (e.g., task 206). The theoretical descent path altitude comprises an altitude criterion for a reference point (or pseudo-reference point) of the flight plan that corresponds to the altitude at the location of the respective reference point based on an ideal and/or optimal descent path from a top of the descent to the bottom of the descent (e.g., the landing location) that satisfies any speed constraints, altitude constraints, and other trajectory rules. In this regard, the flight management system 108 and/or processing architecture 112 obtains the current status information for the aircraft, and for each reference point and/or pseudo-reference point of the flight plan that is downpath from the current location of the aircraft 614, calculates or otherwise determines predicted values for the theoretical descent path altitude using the current location and altitude of the aircraft 614 as the top of the descent for purposes of determining the ideal and/or optimal descent path. As described above, the display process 200 constructs a curve through the predicted values for the theoretical descent path altitude and displays the theoretical descent path curve 620 (alternatively, the theoretical descent path) on the vertical profile 600 (e.g., task 210). In an exemplary embodiment, the display process 200 is configured to highlight portions of the theoretical descent path 620 that the aircraft is not able to follow. For example, as shown in FIG. 6, a portion 622 of the theoretical descent path 620 is highlighted to indicate that it is too steep for the aircraft to follow. In this regard, a portion 622 of the theoretical descent path 620 is too steep for the aircraft to follow when the aircraft cannot follow that portion 622 of the theoretical descent path 620 based on the anticipated aircraft speed and the maximum descent rate of the aircraft while satisfying an altitude constraint at one of the downpath reference points.

Figure 7:
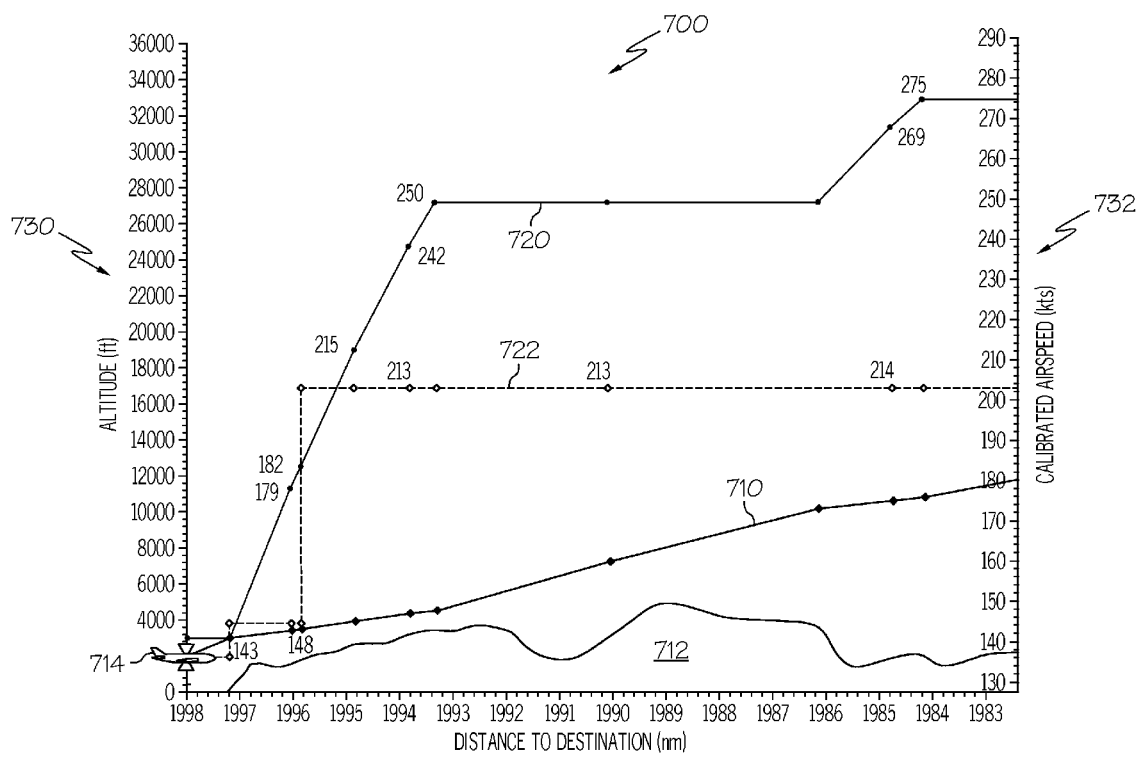
FIG. 7 is a schematic view of an exemplary navigational map including a vertical profile including a calibrated airspeed curve and a minimum calibrated airspeed curve suitable for use with the display process of FIG. 2 in accordance with one embodiment.

FIG. 7 depicts another exemplary embodiment of a vertical profile 700 suitable for display on a display device (e.g., display device 102). The vertical profile 700 may be displayed on the display device 102 proximate a navigational map (e.g., navigational map 300) or other suitable content as described above. As shown, the vertical profile 700 includes a forward predicted trajectory 710 based on the flight plan for the aircraft, as well as a graphical representation of the terrain 712 underlying the forward predicted trajectory 710, in a similar manner as described above. In an exemplary embodiment, the vertical profile 700 also includes a graphical representation of the aircraft 714 that is positioned with respect to the forward predicted trajectory 710 and the terrain 712 in a manner that accurately reflects the real-time altitude and location of the aircraft.

The embodiment of FIG. 7 illustrates the display process 200 in response to identifying the calibrated airspeed and the minimum calibrated airspeed as the strategic operating parameters to be displayed on the vertical profile 700 (e.g., task 206). As described above, the flight management system 108 and/or processing architecture 112 obtains the current status information for the aircraft, and for each reference point and/or pseudo-reference point of the flight plan that is downpath from the current location of the aircraft 714, calculates or otherwise determines predicted values for the calibrated airspeed and the minimum calibrated airspeed. In an exemplary embodiment, the predicted values for the calibrated airspeed and the minimum calibrated airspeed of the aircraft are calculated based at least in part on one or more of the following: the current aircraft gross weight, the current aircraft center of gravity, the current flight phase and/or aerodynamic state of the aircraft, the wind parameters (e.g., wind speed and wind bearing) at the current location of the aircraft, the anticipated flight phase for the aircraft at the respective downpath reference point, the anticipated aerodynamic state of the aircraft at the respective downpath reference point, and the anticipated wind parameters (e.g., wind speed and wind bearing) at the respective downpath reference point (or pseudo-reference point).

As described above, after calculating or otherwise determining predicted values for the selected strategic operating parameters, the display process 200 continues by displaying the predicted values for the selected strategic operating parameters on the vertical profile 700 (e.g., task 210). In the illustrated embodiment of FIG. 7, the display process 200 constructs a calibrated airspeed curve 720 by connecting a plurality of line segments between downpath predicted airspeed values in a piecewise linear manner and constructs a minimum calibrated airspeed curve 722 by connecting a plurality of line segments between downpath predicted minimum calibrated airspeed values in a piecewise linear manner. As shown in FIG. 7, in an exemplary embodiment, the display process 200 displays and/or renders the vertical profile 700 with a first vertical axis 730 corresponding to the forward predicted trajectory 710, a second vertical axis 732 corresponding to the airspeed curves 720, 722 because the forward predicted trajectory values and the calibrated airspeed values have different units of measurement.

One advantage of the systems and/or methods described above is that downpath predicted values for one or more strategic operating parameter(s) may be displayed on a vertical profile. The downpath predicted values are based on current and/or real-time status information for the aircraft, such that the downpath predicted values accurately reflect the optimal values based on the current state of the aircraft. The vertical profile may be positioned with respect to a navigational map or other displayed content in a manner that allows the user to maintain situational awareness while simultaneously reviewing the downpath predicted values for the strategic operating parameter(s).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for presenting operating information for an aircraft, the method comprising:
    displaying a vertical profile on a display device associated with the aircraft, wherein the vertical profile graphically depicts at least a portion of a flight plan for the aircraft, the portion of the flight plan comprising a plurality of reference points;
    displaying a navigational map on the display device, wherein the navigational map is configured to graphically display a current location of the aircraft;
    displaying a graphical user interface element on the display device, wherein the graphical user interface element comprises a list of user-selectable operating parameters, and wherein the graphical user interface element is configured to receive user selections of the user-selectable operating parameters;
    identifying, with a processing architecture, a user-selected first operating parameter from the list of user-selectable operating parameters, in response to user manipulation of the graphical user interface element;
    obtaining current status information for the aircraft;
    calculating, for each reference point of the plurality of reference points, a predicted value of the user-selected first operating parameter for the aircraft at the respective reference point based at least in part on the current status information for the aircraft, resulting in predicted values for the user-selected first operating parameter, wherein the calculating is performed with the processing architecture;
    displaying each of the predicted values for the user-selected first operating parameter near each of the respective reference points in the vertical profile; and
    dynamically updating the vertical profile display based upon continuously obtaining the current status information for the aircraft and calculating the predicted values for the user-selected first operating parameter.

2. The method of claim 1, wherein displaying the predicted values comprises:
    constructing a curve through the predicted values for the user-selected first operating parameter; and
    displaying the curve in the vertical profile.

3. The method of claim 2, further comprising displaying, in the vertical profile, a graphical representation of an altitude profile for the portion of the flight plan, concurrently with the curve through the predicted values for the user-selected first operating parameter.

4. The method of claim 3, further comprising:
    calculating, for each reference point of the plurality of reference points, a predicted value of a user-selected second operating parameter for the aircraft at the respective reference point, resulting in predicted values for the user-selected second operating parameter, wherein the user-selected second operating parameter is selected from the list of user-selectable operating parameters; and
    displaying the predicted values for the user-selected second operating parameter in the vertical profile concurrently with the predicted values for the user-selected first operating parameter and the altitude profile for the portion of the flight plan.

5. The method of claim 4, the user-selected first operating parameter corresponding to a first altitude criterion and the user-selected second operating parameter corresponding to a second altitude criterion, wherein:
    displaying the predicted values for the user-selected first operating parameter comprises displaying a first curve through the predicted values for the first altitude criterion; and
    displaying the predicted values for the user-selected second operating parameter comprises displaying a second curve through the predicted values for the second altitude criterion in the vertical profile concurrently with the first curve.

6. The method of claim 1, wherein calculating the predicted values comprises, for each reference point of the plurality of reference points, optimizing the user-selected first operating parameter in accordance with a cost function.

7. The method of claim 1, wherein:
    calculating the predicted values comprises calculating, for each reference point of the plurality of reference points, an optimized altitude criterion for the aircraft at the respective reference point, resulting in optimized altitude values; and
    displaying the predicted values for the user-selected first operating parameter comprises:
        constructing a curve through the optimized altitude values; and
        displaying the curve in the vertical profile.

8. The method of claim 7, wherein the optimized altitude criterion is selected from the group consisting of an optimum altitude, a recommended cruise flight level, and a maximum altitude.

9. The method of claim 1, wherein calculating the predicted values comprises calculating, for each reference point of the plurality of reference points, a speed criterion for the aircraft at the respective reference point based at least in part on current status information for the aircraft.

10. The method of claim 9, wherein the speed criterion is selected from the group consisting of a maximum operating speed, a stall speed, a maximum range speed, a maximum endurance speed, an aerodynamic configuration speed, and an optimized speed criterion.

11. A method for presenting operational information associated with an aircraft, the method comprising:
- displaying, on a display device of the aircraft, a vertical profile for at least a portion of a flight plan for the aircraft, wherein the vertical profile comprises a graphical display of a corresponding portion of the flight plan, wherein the corresponding portion of the flight plan comprises an altitude profile;
- displaying a graphical display of an instantaneous position of the aircraft on the display device;
- displaying a graphical user interface on the display device, wherein the graphical user interface comprises a list of user-selectable operating parameters, and wherein the graphical user interface is configured to receive user selections of the user-selectable operating parameters;
- obtaining a user-selected first operating parameter from the list of user-selectable operating parameters, in response to user manipulation of the graphical user interface;
- determining, with a processing architecture, predicted values for the user-selected first operating parameter for the aircraft in a manner that is influenced by current status information for the aircraft, the predicted values of the user-selected first operating parameter corresponding to the portion of the flight plan displayed on the display device;
- displaying the predicted values for the user-selected first operating parameter on the display device in conjunction with the vertical profile; and
- dynamically updating the vertical profile display based upon continuously obtaining the current status information for the aircraft and calculating the predicted values for the user-selected first operating parameter, wherein the dynamically updating is performed with the processing architecture.

12. The method of claim 11, further comprising:
- determining predicted values for a user-selected second operating parameter for the aircraft in a manner that is influenced by current status information for the aircraft, the predicted values of the user-selected second operating parameter corresponding to the portion of the flight plan displayed on the display device, wherein the user-selected second operating parameter is selected from the list of user-selectable operating parameters; and
- displaying the predicted values for the user-selected second operating parameter on the display device in conjunction with the vertical profile and the predicted values for the user-selected first operating parameter.

13. The method of claim 11, wherein determining predicted values for the user-selected first operating parameter comprises determining predicted values for the user-selected first operating parameter based at least in part on a current altitude of the aircraft and a current gross weight of the aircraft.

14. The method of claim 13, wherein determining predicted values for the user-selected first operating parameter comprises determining an altitude criterion for the aircraft for the portion of the flight plan.

15. The method of claim 13, wherein determining predicted values for the user-selected first operating parameter comprises determining a speed criterion for the aircraft for the portion of the flight plan.

16. The method of claim 11, wherein:
- determining predicted values for the user-selected first operating parameter comprises determining a theoretical descent profile for the aircraft; and
- displaying the predicted values for the user-selected first operating parameter on the display device in conjunction with the vertical profile comprises displaying the theoretical descent profile in conjunction with the vertical profile.

17. A system on board an aircraft, the system comprising:
- a display device; and
- a flight management system coupled to the display device, wherein the flight management system is configured to:
  - display a vertical profile display on the display device, the vertical profile display corresponding to an altitude profile for a portion of a flight plan for the aircraft, and the vertical profile display comprising a navigational map, and a graphical user interface comprising a menu of user-selectable operating parameters;
  - identify, in response to user interaction with the graphical user interface, a user-selected first operating parameter;
  - obtain current status information for the aircraft, comprising current values of selected operational parameters;
  - calculate, for each reference point of a plurality of reference points within the portion of the flight plan, a predicted value of the user-selected first operating parameter for the aircraft at the respective reference point based at least in part on the current status information for the aircraft, resulting in predicted values for the user-selected first operating parameter;
  - display each of the predicted values for the user-selected first operating parameter above each of the respective reference points in the vertical profile display; and
  - dynamically updating the vertical profile display based upon continuously obtaining the current status information for the aircraft and calculating the predicted values for the user-selected first operating parameter.

18. The system of claim 17, further comprising a sensor system onboard the aircraft and coupled to the flight management system, the sensor system being configured to obtain a parameter associated with operation of the aircraft, wherein the flight management system is configured to calculate predicted values for the user-selected first operating parameter based on the parameter obtained by the sensor system.

19. The system of claim 18, wherein the parameter associated with operation of the aircraft is selected from the group consisting of a gross weight of the aircraft, a fuel flow rate, a fuel remaining, an altitude of the aircraft, and a speed of the aircraft.

* * * * *